United States Patent [19]

Tiba et al.

[11] Patent Number: 4,699,970

[45] Date of Patent: Oct. 13, 1987

[54] RESIN FROM PHENOLIC AND OXAZOLINE USING PHOSPHOROUS ACID ESTER AS CATALYST

[75] Inventors: Omar Tiba, Dublin; Billy M. Culbertson, Worthington, both of Ohio

[73] Assignee: Ashland Oil, Inc., Ashland, Ky.

[21] Appl. No.: 880,477

[22] Filed: Jun. 30, 1986

[51] Int. Cl.⁴ .................................................. C08G 8/28
[52] U.S. Cl. ...................................... 528/141; 525/298; 525/328.8; 525/375; 525/480; 525/504; 528/153; 528/163; 528/211
[58] Field of Search ............... 528/141, 153, 163, 211; 525/375, 328.8, 298, 480, 504

[56] References Cited

U.S. PATENT DOCUMENTS

| 4,195,154 | 3/1980 | Kaiser et al. | 528/99 |
| 4,430,491 | 2/1984 | Culbertson et al. | 528/153 |
| 4,613,662 | 9/1986 | Goel | 528/211 |

Primary Examiner—Harold D. Anderson
Attorney, Agent, or Firm—John F. Jones

[57] ABSTRACT

The process for preparing a polymeric composition at improved rate comprising reacting an oxazoline compound and a phenolic compound in the presence of a catalytic amount of a phosphorous acid ester is described.

12 Claims, No Drawings

RESIN FROM PHENOLIC AND OXAZOLINE USING PHOSPHOROUS ACID ESTER AS CATALYST

This invention relates to an improved process for the production of thermoplastic and thermoset resins at an improved reaction rate by carrying out the reaction between polyphenolic compounds and oxazolines in the presence of a dialkyl, diaryl, trialkyl or a triaryl phosphite catalyst to produce polyetheramides.

The present invention is an improvement over the process described in U.S. Pat No. 4,430,491.

The reaction of oxazolines with dicarboxylic acids using triphenyl phosphite is known (U.S. Pat. No. 4,474,942 and European Patent No. 0,141,345 A2). No previous description of the use of phosphite ester catalysts to improve the rate of reaction between phenolic compounds and oxazolines has been published.

We have discovered that certain phosphorous acid esters, also called phosphite catalysts will increase the rate of reaction between phenolic compounds and oxazoline compounds. The reaction is preferably carried out at a temperature in the range of from 100° C. to 275° C. preferably from 130° C. to 225° C. using a weight ratio of phenolic material to oxazoline of from 90:10 to 30:70. The phosphite ester catalyst may be used in from 0.5 to 5% by weight based on the weight of the other ingredients.

Oxazoline compounds useful in this invention which are bis-oxazolines containing at least two 2-oxazoline groups per molecule include: 4,4', 5,5'-tetrahydro-2,2'-bisoxazole; a 2,2'-(alkanediyl) bis [4,5-dihydrooxazole], e.g., 2,2'-(1,4butanediyl) bis [4,5-dihydrooxazole]2,2'-(1,4-cyclohexanediyl) bis[4,5-dihydrooxazole]; a 2,2'-(arylene) bis[4,5-dihydrooxazole], e.g., 2,2'-(1,4-phenylene) bis[4,5dihydrooxazole], 2,2'-(1,5-naphthalenyl) bis[4,5-dihydrooxazole] and 2,2'-(1,8-anthracenyl) bis[4,5-dihydrooxazole]; a sulfonyl, oxy, thio or alkylene bis 2-(arylene) [4,5-dihydrooxazole], e.g., sulfonyl bis 2-(1,4-phenylene) [4,5dihydrooxazole], thio bis 2-(1,4-phenylene) [4,5-dihydrooxozole] and methylene bis 2-(1,4-phenylene) [4,5-dihydrooxazole]; a 2,2',2"-(arylene) tris [4,5-dihydrooxazole], e.g., 2,2',2"-(1,3,5-phenylene) tris [4,5-dihydrooxazole]; a poly [2-(alkenyl)4,5-hydrooxazole]e.g., poly[2-(2-propenyl) 4,5-dihydrooxazole].

The phenolic compounds useful in this invention include those compounds which preferably contain two or more phenolic hydroxyl groups per molecule and include such specific compounds as a phenol-formaldehyde condensation product, poly (vinyl phenol):

1,4 benzene diol(hydroquinone), 1,3-benzenediol (resorcinol), 1,5-naphthalene diol and 1,3,5-benzene triol; the biphenyl diols, e.g., [1,1'-biphenyl]-2,2'-diol; the alkylene and cycloalkylene bisphenols, e.g., 2,4'-diol; the alkylene and cycloalkylene bisphenols, e.g., 2,2'methylene bisphenol, 4,4'-(1-methylethylidene) bisphenol (Bisphenol A), 4,4'-(phenylmethylene) bisphenol, 4,4'-(cyclohexanediyl) bisphenol, 4,4'-(1,2-diethyl-1,2-ethenediyl) bisphenol, and 3,4-bis(4-hydroxyphenyl)-2,4-hexadiene; the arylene bisphenols, e.g., 4,4'-phenylene bisphenol; the oxy, thio and sulfonylbisphenols, e.g., 2,3'-oxybisphenol 4,4'-thiobisphenol and 2,2'-sulfonyl bisphenol; the bis (hydroxyaryl) alkanones, e.g., bis (4-hydroxyphenyl) methanone, 1,5-dihydroxy-9,10-anthracenedione and 4-[bis(4-hydroxyphenyl)methylene]-2,5-cyclohexadien-1-one; the various benzamide and benzoate derivatives, e.g., 2-hydroxy-N-(4-hydroxyphenyl) benzamide, 4-hydroxy-4-hydroxyphenyl benzoate, 2-methyl-2-[[(4-hydroxybenzoyl) oxy]methyl]-1,3-propanediyl-4-hydroxybenzoate, bis(4-hydroxy benzoate)-1,2-ethandiyl; 2-(4-hydroxy benzoate) ethyl ether, bis (4-hydroxy benzamide)-1,6-hexanediyl and bis (4-hydroxy benzamide)-1,4-benzenediyl.

The catalysts useful in this invention are trialkyl, triaryl, dialkyl and diaryl phosphites conforming to the formula I or II or mixtures thereof.

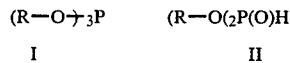

wherein R independently represents an alkyl group or halogenated alkyl group having from 1 to 20 carbon atoms, an aryl group or halogenated aryl group having from 6 to 12 carbon atoms or an aralkyl or halogenated aralkyl group having from 7 to 20 carbon atoms.

Specific phosphite catalysts include triphenyl phosphite, tri-n-butyl phosphite, triethyl phosphite, trimethyl phosphite, tris(nonyl phenyl) phosphite, tris(2-ethyl hexyl) phosphite, tris stearyl phosphite, diphenyl monodecyl phosphite, diphenyl phosphite, dimethyl phosphite, di-n-butyl phosphite, and Bisphenol-A pentarythritol phosphite, bis(2,4-di-t-butyl) pentaerythritol diphosphite, disteryl pentarythritol diphosphite, and the like and mixtures thereof. The phosphite catalysts embodied in this invention may be used with other known catalysts to vary cure rates as would be apparent to those skilled in the art.

The resins produced by the process of this invention can contain fillers, pigments, fibers, etc. and are useful in many applications including the formation of fiber-reinforced and advanced composite engineering plastic materials, in reaction injection molding, adhesive and coating applications of many kinds.

This invention is further illustrated in the following representative examples.

EXAMPLE 1

A mixture of 4g of 1,3-phenylene bisoxazoline and 6g of phenol-free novolac (a phenol-formaldehyde condensation product from American Hoechst, Alnovol PN-320 melting point 83°–88° C. (acid no less than about 1)) was heated at 175° C. and to the resulting homogeneous solution was added with stirring 0.1 g (1% of total weight) of tributyl phosphite. The resulting solution gelled after 5 minutes and was cured at 225° C. under a positive pressure of nitrogen gas for 1 hour. An amber-colored, transparent solid product resulted. The infrared spectrum for this material showed absorption bands typical of amide and ether bonds. Thermal analysis of the product with the differential scanning calorimeter (DSC) showed that it had a glass transition temperature (Tg) of 146° C.

EXAMPLE 2

The procedure of example 1 was followed using 3 g of the bisoxazoline, 7 g of the phenol-formadehyde condensation product and 1% by weight of tributyl phosphite. The resin product was post cured for one hour and the resulting resin was found to have a Tg by DSC of 156° C.

EXAMPLE 3

A. A poly(vinyl phenol) (Resin M, Maruzen Chemical Co.) having a molecular weight of about 1900 (6g) was mixed in the melt at 175° C. with 4 g of the bisoxazoline described in example 1 and 0.1 g of tributyl phosphite. The mixture gelled in 20 minutes. Post curing at 225° C. for two hours produced a polymeric product having a Tg (DSC) of 164° C.

B. The procedure described in A above was followed using a poly(vinyl phenol) having a molecular weight of about 30,000. The final polymeric product was found to have a Tg (DSC) of 210° C.

EXAMPLE 4

The procedure of example 1 was followed using 4g of the bisoxazoline, 6 g of the phenol-formaldehyde novolac and 0.1 g of diphenyl phosphite. The liquid mixture gelled in 2 minutes at 175° C. and post curing of the resin at 225° C. was done for 30 minutes and the resulting resin was found to have a Tg (DSC) of 164° C.

EXAMPLE 5

The procedure of example 1 was followed using 1% of triphenyl phosphite as a catalyst. The mixture gelled in 5 minutes. Post curing at 225° C. for one hour produced thermosetting material having a Tg (DSC) of 157.6° C.

EXAMPLE 6

The procedure of example 1 was followed using 1% of tris (4-chloro phenyl) phosphite as a catalyst. The mixture gelled at 25 minutes. Post curing at 225° C. for one hour produced a polymeric material having a Tg (DSC) of 171.8° C.

EXAMPLE 7

The procedure of example 1 was followed using 1% of diphenyl-i-decyl phosphite as a catalyst. The mixture gelled in 26 minutes. Post curing at 225° C. for one hour produced a polymeric material having a Tg (DSC) of 183.9° C.

EXAMPLE 8

A mixture of 4.3 g of 1,3-phenylene bisoxazoline, 3 g of phenol-free novolac, and 1.1 g of resorcinol was heated at 175° C. with stirring. Triphenyl phosphite (1% of total weight) was added. The polymeric material was post-cured at 225° C. for one hour. Thermal analysis of the product with (DSC) gave a Tg of 138.3° C. The additions of the resorcinol improved the toughness of the final product as shown by GLC value which improved heat distortion temperature up to 1.1 in. lb/in$^2$ from 0.865 without resorcinol.

EXAMPLE 9

A mixture of 3 g of poly (p-vinyl phenol), 3 g of phenol-free novolac and 4 g of 1,3 phenylene-bisoxazoline was heated at 175° C. Triphenyl phosphite 0.10 g (1% of total weight) was added with stirring. The mixture gelled in 25 minutes. Post curing at 225° C. for one hour gave a polymeric material having a Tg (DSC) of 179.1° C.

EXAMPLE 10

A mixture of 10 g of phenol-free novolac, 5 g of 1,3-phenylene bisoxazoline and 5 g of 1,4-phenylene-bisoxazoline was heated at 175° C. with stirring. To the clear mixture triphenyl phosphite (1% of total weight) was added. The mixture was gelled in 15 minutes. Post curing at 225° C. for one hour gave a polymeric material having a Tg (DSC) of 195.1° C.

We claim:

1. The process for preparing a polymeric composition comprising reacting a mixture of a phenolic compound and an oxazoline compound in the presence of a catalytic amount of a phosphorous acid ester conforming to the formula I or II or mixtures thereof.

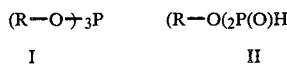

$$(R-O)_3P \qquad (R-O)_2P(O)H$$
$$\text{I} \qquad\qquad \text{II}$$

wherein R represents independently an alkyl group or halogenated alkyl group having from 1 to 20 carbon atoms, an aryl group or halogenated aryl group having from 6 to 12 carbon atoms or an aralkyl group or halogenated aralkyl group having from 7 to 20 carbon atoms.

2. The process of claim 1 carried out at a temperature in the range of from 100° C. to 275° C.

3. The process of claim 2 wherein the weight ratio of phenolic compound to oxazoline compound is in the range of from 90:10 to 30:70.

4. The process of claim 3 wherein the phosphorous acid ester is used in from 0.5 to 5% by weight based on the weight of the other ingredients.

5. The process of claim 4 wherein the oxazoline compound contains at least two 2-oxazoline groups per molecule.

6. The process of claim 5 wherein the phenolic compound is one which contains two or more phenolic hydroxyl groups per molecule.

7. The process of claim 6 wherein the oxazoline compound is 1,3-phenylene bisoxazoline, the phenolic compound is a phenol-formaldehyde condensation product and the phosphorous acid ester is tributyl phosphite.

8. The process of claim 6 wherein the oxazoline compound is 1,3-phenylene bisoxazoline, the phenolic compound is poly(vinyl phenol) and the phosphorous acid ester is tributyl phosphite.

9. The process of claim 6 wherein the oxazoline compound is 1,3-phenylene bisoxazoline, the phenolic compound is a phenol-formaldehyde condensation product and the phosphorous acid ester is diphenyl phosphite.

10. The process of claim 6 wherein the oxazoline compound is 1,3-phenylene bis-oxazoline, the phenolic compound is a phenol-formaldehyde condensation product and the phosphorous acid ester is tris (4-chloro phenyl) phosphite.

11. The process of claim 6 wherein the oxazoline compound is 1,3-phenylene bisoxazoline, the phenolic compound is a phenol-formaldehyde condensation product and the phosphorous acid ester is diphenyl-i-decyl phosphite.

12. The process of claim 6 wherein the oxazoline compound is a mixture of 1,3-phenylene bisoxazoline and 1,4-phenylene bisoxazoline, the phenolic compound is a phenol-formaldehyde condensation product and the phosphorous acid ester is triphenyl phosphite.

* * * * *